United States Patent
Kryvaltsevich

(10) Patent No.: US 10,248,327 B2
(45) Date of Patent: Apr. 2, 2019

(54) THROTTLING FOR A MEMORY SYSTEM USING A GC/HOST RATIO AND OPERATING METHOD THEREOF

(71) Applicant: SK hynix Inc., Gyeonggi-do OT (KR)

(72) Inventor: Siarhei Kryvaltsevich, San Jose, CA (US)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 15/476,503

(22) Filed: Mar. 31, 2017

(65) Prior Publication Data

US 2017/0285945 A1 Oct. 5, 2017

Related U.S. Application Data

(60) Provisional application No. 62/317,364, filed on Apr. 1, 2016.

(51) Int. Cl.
*G06F 12/00* (2006.01)
*G06F 3/06* (2006.01)
*G06F 12/02* (2006.01)

(52) U.S. Cl.
CPC .......... *G06F 3/061* (2013.01); *G06F 3/0659* (2013.01); *G06F 3/0688* (2013.01); *G06F 12/0246* (2013.01); *G06F 2212/7205* (2013.01)

(58) Field of Classification Search
CPC .... G06F 3/061; G06F 12/0253; G06F 3/0688; G06F 3/0659; G06F 2212/7205; G06F 12/0276
USPC .......................... 707/813, 693; 711/170, 165
See application file for complete search history.

(56) References Cited

U.S. PATENT DOCUMENTS

| | | | | |
|---|---|---|---|---|
| 8,452,912 | B2 | 5/2013 | Lee et al. | |
| 8,725,931 | B1* | 5/2014 | Kang | G06F 12/0246 710/52 |
| 9,652,382 | B1* | 5/2017 | Subramanian | G06F 12/0246 |
| 2011/0055455 | A1* | 3/2011 | Post | G06F 12/0246 711/103 |
| 2012/0278530 | A1* | 11/2012 | Ebsen | G06F 3/0659 711/103 |
| 2014/0281127 | A1 | 9/2014 | Marcu et al. | |
| 2017/0010815 | A1* | 1/2017 | Sprouse | G06F 3/0604 |
| 2017/0160953 | A1* | 6/2017 | Hirata | G06F 3/0611 |
| 2017/0351604 | A1* | 12/2017 | Tang | G06F 12/0246 |
| 2018/0018269 | A1* | 1/2018 | Jannyavula Venkata | G06F 12/0888 |

OTHER PUBLICATIONS

Hu et al., Write Amplification Analysis in Flash-Based Solid State Drives, SYSTOR 2009 The Israeli Experimental Systems Conference, May 4-6, 2009, IBM R&D Labs, Israel.

* cited by examiner

*Primary Examiner* — Hong C Kim
(74) *Attorney, Agent, or Firm* — IP & T Group LLP

(57) ABSTRACT

A semiconductor memory system and an operating method thereof include: a memory device; and a memory controller including a processor, coupled to the memory device, containing instructions executed by the processor, and configured to provide sets of throttling numbers, select a throttling mode, calculate a garbage collection (GC)/HOST ratio based on at least a part of invalid count of garbage collection (GC) blocks and valid count of BGC blocks, and adjust throttling parameters of commands in accordance with the GC/HOST ratio and a number of erased blocks.

20 Claims, 11 Drawing Sheets

THROTTLING FOR A MEMORY SYSTEM USING A GC/HOST RATIO AND OPERATING METHOD THEREOF

CROSS-REFERENCES TO RELATED APPLICATIONS

This application claims the benefit of U.S. Provisional Application No. 62/317,364 filed Apr. 1, 2016, the entire contents of which are incorporated herein by reference.

BACKGROUND

Field of Invention

Exemplary embodiments of the present disclosure relate to a memory system and an operating method thereof.

Description of Related Arts

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, such as a data storage device. The data storage device is used as a main memory device or an auxiliary memory device of the portable electronic devices.

Data storage devices using the memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD can include flash memory components and a SSD controller. The SSD controller can be also referred as a processor, which includes the electronics that bridge the flash memory components to the SSD input/output (I/O) interfaces.

Thus, there remains a need for a semiconductor memory system and operating method thereof for throttling/scheduling to improve the memory system performance. In view of the ever-increasing need to improve performance and security, it is more and more critical that answers be found to these problems. Solutions to these problems have been long sought but prior developments have not taught or suggested any solutions and, thus, solutions to these problems have long eluded those skilled in the art.

SUMMARY

Embodiments of the present disclosure are directed to a semiconductor memory system and an operating method thereof capable of improving the performance and security of a SSD memory system.

A semiconductor memory system includes: a memory device; and a memory controller including a processor, coupled to the memory device, containing instructions executed by the processor, and configured to provide sets of throttling numbers, select a throttling mode, calculate a garbage collection (GC)/HOST ratio based on at least a part of invalid count of GC blocks and valid count of GC blocks, and adjust throttling parameters of commands in accordance with the GC/HOST ratio and a number of erased blocks.

An operating method of a semiconductor memory system comprising: providing sets of throttling numbers, selecting a throttling mode, calculating a garbage collection (GC)/HOST ratio based on at least a part of invalid count of GC blocks and valid count of GC blocks, and adjusting throttling parameters of commands in accordance with the GC/HOST ratio and a number of erased blocks.

DETAILED DESCRIPTION

Figure 1:
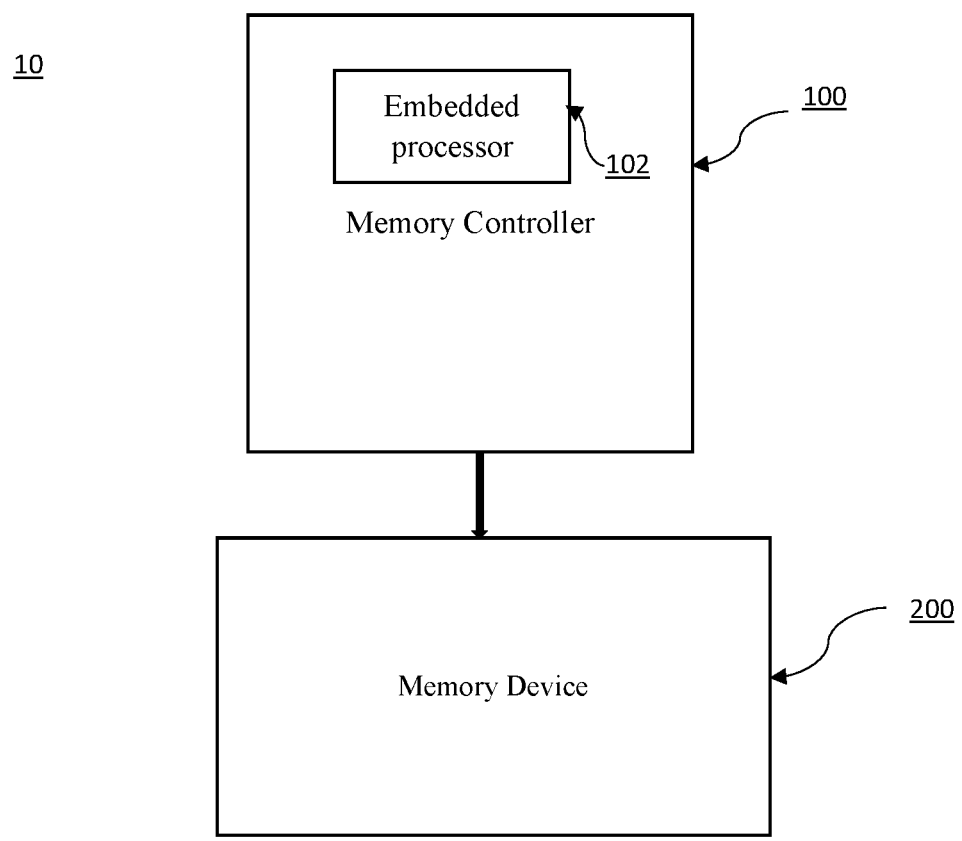
FIG. 1 is a top-level block diagram schematically illustrating a semiconductor memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A semiconductor memory system, such as a SSD, can include flash memory components and a SSD controller. The SSD controller can be also referred as a processor, which includes the electronics that bridge the flash memory components to the SSD input/output (I/O) interfaces.

The SSD controller can include an embedded processor that can execute functional components, such as firmware. The SSD functional components are device specific, and in most cases, can be updated.

Flash memory components are typically written in units of blocks including a plurality of pages of data. Over time, some of the pages are marked invalid, when updated data in the pages is written to another block. When the flash memory wants to write a page in an existing block, the flash memory first reads previously-stored pages in the existing block, and then writes the previously-stored pages and the new page to another block in memory. Because some of the previously-stored pages may no longer be valid, only valid pages are selected and written to the new block. This process can be time consuming and can reduce the performance of the memory system.

In high write environments, such as enterprise solutions, garbage collection (GC) can move data in parallel with the HOST write commands, such as a background garbage collection (BGC). BGC commands can share a bandwidth of the memory system with the HOST commands, and can affect the memory system performance characteristics of the bandwidth and consistency.

A good balanced throttling of the memory system can minimize negative effect of BGC to the performance consistency of the memory system. The throttling may satisfy the following conditions:

1. Keep good performance consistency of the memory system. The bandwidth of the HOST input/output (I/O) commands may not fluctuate in a short time interval.

2. Maintain a number of erased NAND flash blocks within predetermined certain limits. Increasing the number of erased blocks can stop BGC and cause temporary performance boost, while decreasing the number of erased blocks can lead to temporary blocking of the HOST write commands.

3. Utilize throughput of NAND flash memory. The throttling may not hold NAND flash commands in order to achieve aforementioned conditions.

Depending on HOST traffic, the BGC commands or HOST commands could be stopped because instability of the number of erased NAND flash blocks, such that the number of erased blocks can go too high or too low. Introduction of throttling of embodiments of the current invention can improve performance consistency and stabilize the memory system.

FIG. 1 is a top-level block diagram schematically illustrating a semiconductor memory system in accordance with an embodiment of the present invention. Referring FIG. 1, the memory system 10 may include a memory controller 100 and a memory device 200. The memory controller 100 may control overall operations of the memory device 200.

The memory device 200 may perform one or more erase, program, and read operations under the control of the memory controller 100, wherein the memory controller may include an embedded processor 102. The memory device 200 may receive a command CMD, an address ADDR and data through input/output lines. The memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the memory device 200 may be integrated in a single semiconductor device. For example, the memory controller 100 and the memory device 200 may be integrated in a single semiconductor device such as a SSD. The SSD may include a storage device for storing data therein. When the memory system 10 is used in an SSD, operation speed of a host (not shown) coupled to the memory system 10 may remarkably improve.

The memory controller 100 and the memory device 200 may be integrated in a single semiconductor device such as a memory card. For example, the memory controller 100 and the memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (micro MMC), a secure digital (SD) card, a mini secure digital (mini SD) card, a micro secure digital (micro SD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data centre, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
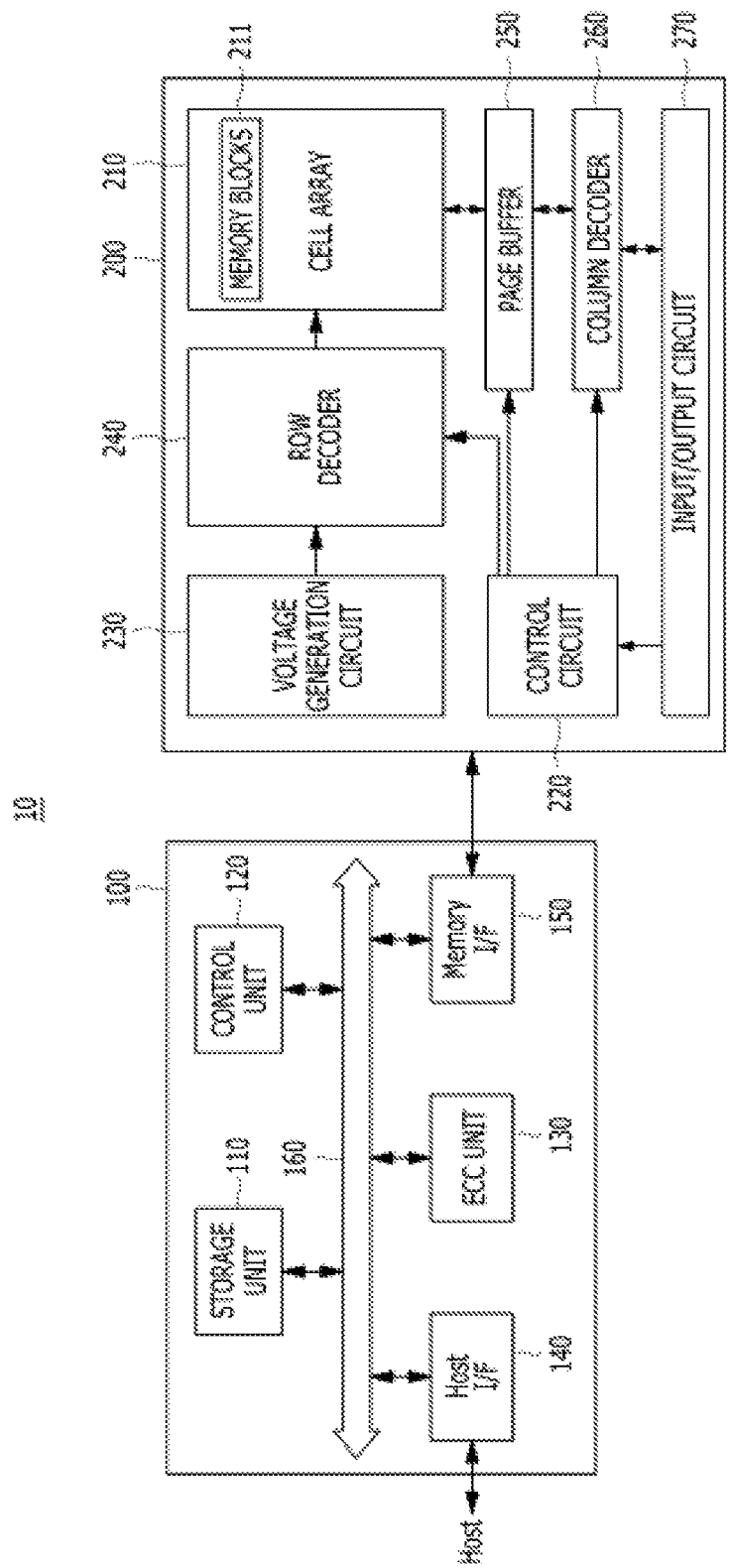
FIG. 2 is a detailed block diagram illustrating a semiconductor memory system in accordance with an embodiment of the present invention.

FIG. 2 is a detailed block diagram illustrating a semiconductor memory system in accordance with an embodiment of the present invention. For example, the semiconductor memory system of FIG. 2 may depict the memory system 10 shown in FIG. 1.

Referring to FIG. 2, the memory system 10 may include the memory controller 100 and the memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magneto-resistive RAM (MRAM) and a resistive RAM (RRAM).

The memory controller 100 may control storage of data in the memory device 200. For example, the memory controller 100 may control the memory device 200 in response to a request from the host device. The memory controller 100 may provide the data read from the memory device 200, to the host device, and store the data provided from the host device into the memory device 200.

The memory controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the memory controller 100, and store data for driving the memory system 10 and the memory controller 100. When the memory controller 100 controls operations of the memory device 200, the storage unit 110 may store data used by the memory controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the memory controller 100 and the memory device 200 to allow the memory controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
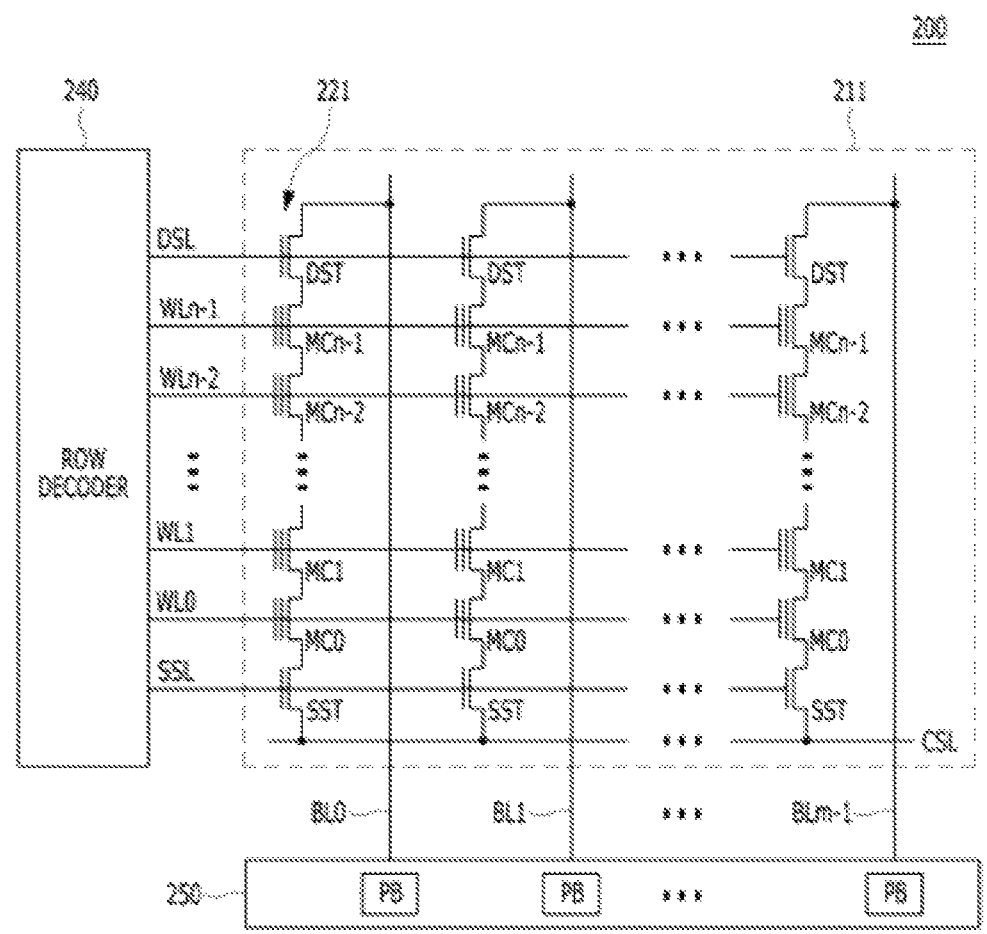
FIG. 3 is a circuit diagram illustrating a memory block of semiconductor memory devices in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory device 200 shown in FIG. 2.

Referring to FIG. 3, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Following is a scenario table showing two possible scenarios regarding the performance of the HOST interface and BGC.

|  | Scenario #1: performance of HOST is less than productivity of BGC | Scenario #2: Performance of HOST is bigger or equal to productivity of BGC |
|---|---|---|
| Number of erased blocks (valid open) | Goes UP | Goes DOWN |
| Throttle mode | BGC | HOST |

Figure 4:
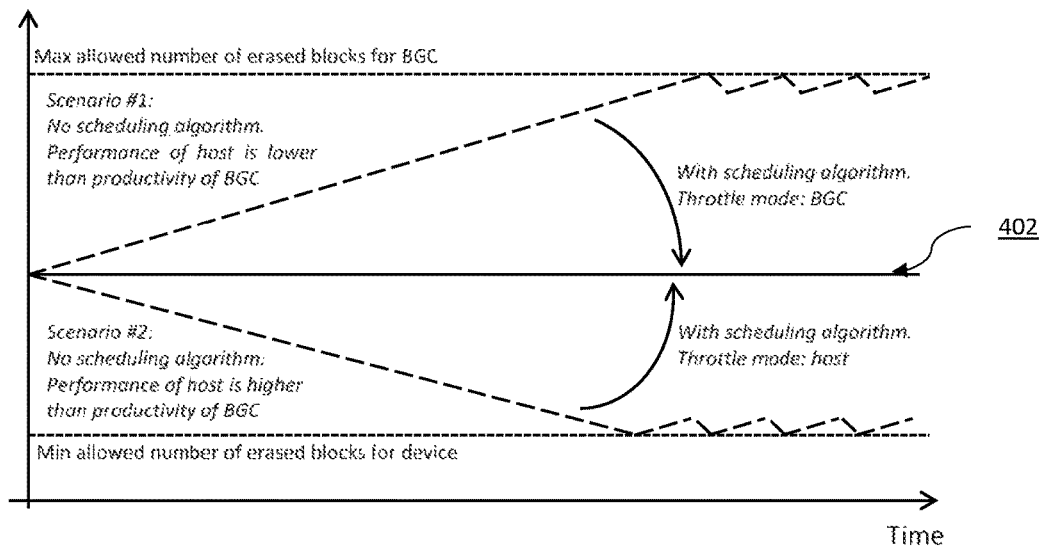
FIG. 4 is a diagram illustrating garbage collection (GC) of a semiconductor memory system without throttling.

FIG. 4 is a diagram illustrating GC of a semiconductor memory system without throttling. FIG. 4 shows behavior of the number of erased blocks over the time in both scenarios of the above table, at different throttling modes including the BGC mode and the HOST mode. The horizontal axis represents time of the memory system operates while the vertical axis represents the number of erased blocks/free blocks. The number of erased blocks can be at a balance point initially, when the time is zero.

For first scenario, the number of erased blocks eventually can reach the number when BGC can be no longer needed and can be stopped for short interval until the HOST writes enough data to initiate the BGC again.

During the first scenario, the BGC can outperformance the HOST, the number of erased blocks can go up and farther away from a balance point line 402 over the time. The BGC can generate the open blocks at a higher rate than the HOST can write data thereto. Thus, over the time, more erased blocks can be available in the memory system. The throttling mode can be set as the BGC mode, and the throttling controller can adjust the number of the HOST commands and BGC commands to bring the number of erased blocks down and back to the balance point line 402.

For second scenario, the number of erased blocks can reach the minimal allowed value when the BGC command cannot be executed, and the HOST commands can be blocked in order to let the BGC to restore number of blocks.

During the second scenario, the HOST can perform at the same or higher rate than the BGC, the number of erased blocks can go down and farther away from the balance point line 402 over the time. The BGC can generate the open blocks at a lower or equal rate than the HOST can write data thereto. Thus, over the time, less erased blocks can be available in the memory system. The throttling mode can be set as the HOST mode, and the throttling controller can adjust the number of the HOST commands to bring the number of erased blocks up and back to the balance point line 402.

Figure 5:
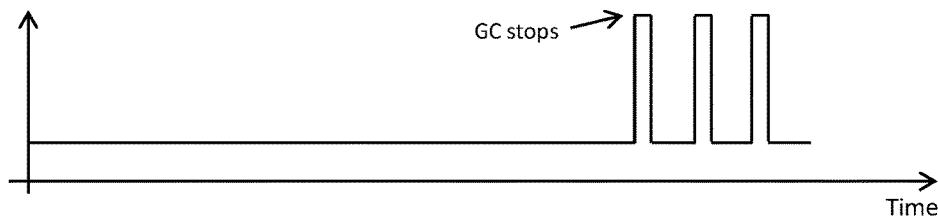
FIG. 5 is a diagram illustrating performance behavior of the memory system of FIG. 4.
Figure 5:
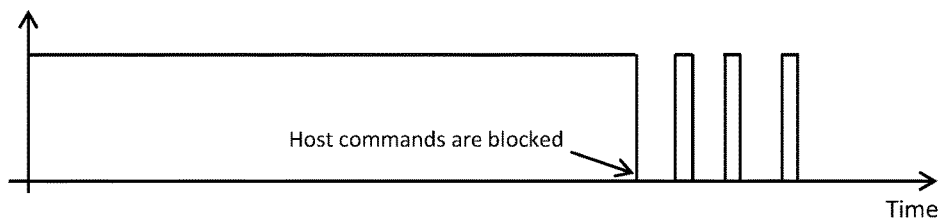

FIG. 5 is a diagram illustrating performance behavior of the memory system of FIG. 4. FIG. 5 shows HOST performance under scenarios 1 and 2 of the scenario table.

Under scenario 1, the HOST performance is less than the BGC productivity, the number of erased blocks can go up over the time. When the number of erased blocks is reached a maximum value, the BGC needs to stop. Because no BGC commands are sent when the BGC stops, the entire bandwidth can be utilized by the HOST, resulting in burst of the HOST commands. The burst of the HOST performance may cause inconsistent performance of the memory system.

Under scenario 2, the HOST performance is greater than the BGC productivity, the number of erased blocks can go down over the time. When the number of erased blocks is reached a minimum value, the BGC may stop due to insufficient erased blocks available for the BGC to perform. The HOST commands can be blocked when the BGC stops resulting in inconsistent performance of the memory system.

In accordance with the throttling modes, the throttling controller can conduct throttling by decreasing the performance of the HOST to bring up the number of erased blocks, or decreasing the performance of the BGC to bring down the number of erased blocks.

Figure 6:
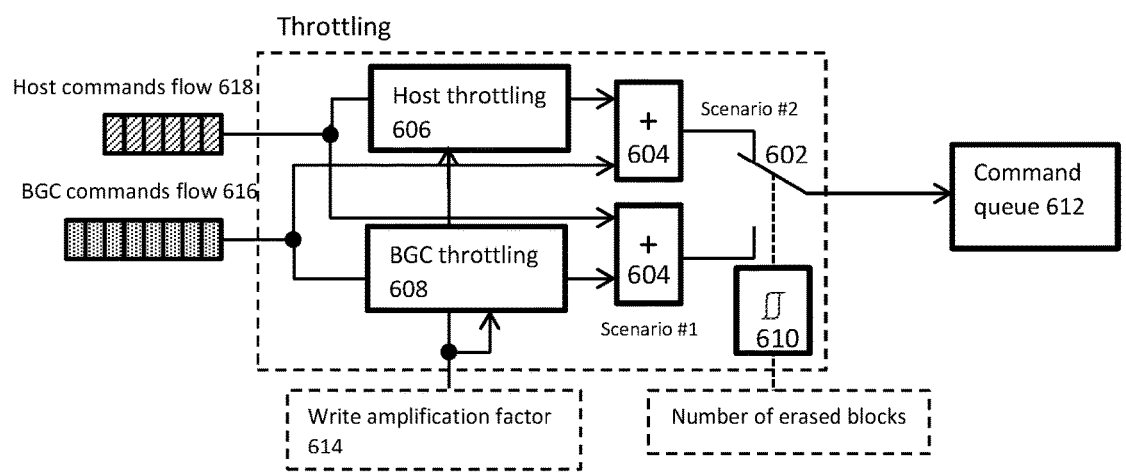
FIG. 6 is a block diagram schematically illustrating throttling of a semiconductor system in accordance with an embodiment of the present invention.

FIG. 6 is a block diagram schematically illustrating throttling of a semiconductor system in accordance with an embodiment of the present invention. The memory system with throttling can maintain the number of erased blocks constant for both scenarios above by throttling one of two sources of commands, such as the HOST commands and the BGC commands as shown in FIG. 4.

The block diagram shown in FIG. 6 can include a throttling mode selector 602, adders 604, HOST throttling 606, BGC throttling 608, a hysteresis module 610 for controlling selector 602, a command queue 612, a write amplification factor 614, a BGC commands flow 616, and a HOST commands flow 618.

In the embodiments of the present invention, a throttling controller can be utilized to coordinate the activities between the background garbage collection (BGC) and the HOST interface. The purpose of throttling is to control that the BGC can generate blocks at the same rate as the HOST interface consumes the blocks, such that the memory device doesn't run out of HOST open blocks for writing and the BGC doesn't stop operate. A well-coordinated throttling can keep the memory device performance consistent.

The SSD needs throttling because a balance needs to be maintained to ensure sufficient valid open blocks generated by the BGC are available for write operation conducted by the HOST interface. HOST commands and BGC commands can be conducted simultaneously sharing bandwidth of the memory system. Performance of the HOST is represented by a number of the HOST commands, and performance of the BGC is represented by a number of the BGC commands during a fixed period of time.

Throttling can maintain the number of erased NAND flash blocks within certain limits. The restriction of change of the number of erased blocks can prevent mode change and performance fluctuations of the BGC, resulting in a good performance consistency of the memory system. In order to achieve this, throttling can be used to control the BGC to reclaim erased blocks with the same productivity rate as the HOST consumes the erased blocks.

For Scenario #1, the HOST can send as many HOST commands as needed, the memory system can throttle the BGC by the BGC throttling 608 using the rest of the bandwidth. The total commands including the HOST commands and the throttled BGC commands can be output to command queue 612, via the throttling mode selector 602. The throttling mode selector 602 can be controlled by the hysteresis module 610, wherein the hysteresis module 610 can prevent accidental change of the throttle mode. When the number of the erased blocks goes up, the hysteresis module 610 can control the throttling mode selector 602 to switch to scenario #1. The total commands can be pipelined in the command queue 612 for execution.

For Scenario #2, the HOST commands can be throttled by the HOST throttling 606 and the BGC commands using the rest of the bandwidth. The total commands including the BGC commands and the throttled HOST commands can be output to the command queue 612, via the throttling mode selector 602. The throttling mode selector 602 can be controlled by the hysteresis module 610, wherein the hysteresis module 610 can prevent accidental change of the throttle mode. When the number of the erased blocks goes down, the hysteresis module 610 can control the throttling mode selector 602 to switch to scenario #2. The total commands can be pipelined in the command queue 612 for execution.

The mechanism of the throttling can fully utilize the bandwidth of the memory system, since the throttled HOST commands and BGC commands can share the bandwidth.

The throttling mode can be selected according to a current number of erased NAND flash blocks. A greater number of erased blocks can indicate a sufficient number of erased blocks available in the memory system. The memory system may not need very aggressive BGC to be throttled, as in scenario #1.

A smaller number of erased blocks can indicate an insufficient number of erased blocks available in the memory system. The HOST may have sent too many commands and the HOST commands may need to be throttled, as in scenario #2.

Level of throttling can depend on the write amplification factor 614. The greater write amplification factor 614 may indicate that a stronger throttling may be required. As shown in the block diagram, the write amplification factor 614 can be applied to the HOST throttling 606 and the BGC throttling 608.

Figure 7A:
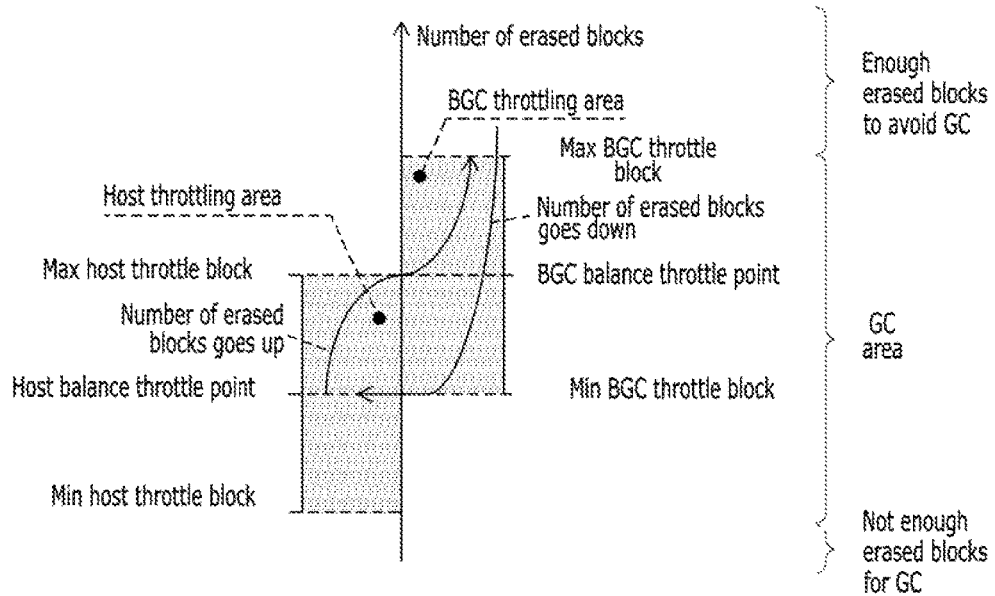
FIG. 7A is a diagram illustrating sets of throttling numbers of a semiconductor memory system in accordance with an embodiment of the present invention.

FIG. 7A is a diagram illustrating sets of throttling numbers of a semiconductor memory system in accordance with an embodiment of the present invention. The range of the number of NAND flash blocks available for the BGC can be divided into two areas, BGC throttling area and HOST throttling area. The areas can be constrained by sets of throttling parameters including a set of HOST throttling numbers and a set of BGC throttling numbers. The throttling modes can include the BGC throttling mode and the HOST throttling mode.

The set of HOST throttling numbers can include a Max HOST throttle block number, a HOST balance throttle point, and a Min HOST throttle block number. The HOST throttling can be conducted when the throttling mode is set at the HOST throttling mode, while the number of erased blocks is at the HOST throttling area, such as lower than the Max HOST throttle block number and higher than the Min HOST throttle block number.

The set of BGC throttling numbers can include a Max BGC throttle block number, a BGC balance throttle point, and a Min BGC throttle block number. The BGC throttling can be conducted when the throttling mode is set at the BGC throttling mode, while the number of erased blocks is at the BGC throttling area, such as lower than the Max BGC throttle block number and higher than the Min BGC throttle block number.

The balance points can be set between the maximum throttling number and the minimum throttling number, such as the central points of the BGC throttling area and the HOST throttling area. Throttling may attempt to maintain the number of erased blocks equal to the balance point of current throttling mode, such that the calculations may not have any errors and no corrections are required.

The BGC throttling area and the HOST throttling area can be overlapped. As shown in FIG. 7A, the BGC balance throttle point of the BGC throttling area can be aligned with the Max HOST throttle block number of the HOST throttling area, and the HOST balance throttle point of the HOST throttling area can be aligned with the Min BGC throttle block number of the BGC throttling area. The overlapped BGC throttling area and the HOST throttling area can achieve more efficient block usage, form hysteresis, reduce probability of mode switching, and automatically put the throttling into balance points after switching from one mode to another.

When the number of erased blocks is higher than the Max BGC throttle block number, the BGC can be stopped because of enough erased blocks available in the memory system for executing the HOST commands. When the number of erased blocks is lower than the Min HOST throttle block number, the BGC cannot be conducted because of insufficient erased blocks available in the memory system for starting BGC.

The sets of throttling parameters, or the constrains of number of erased blocks in the HOST throttling mode and the BGC throttling mode can be predetermined by characteristics of the memory system and performance requirements.

Figure 7B:
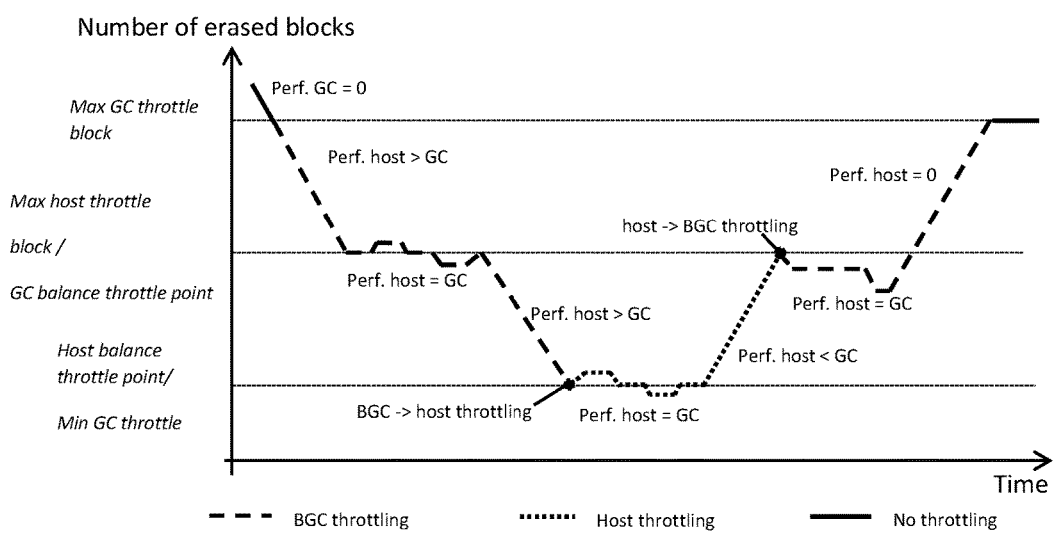
FIG. 7B is a diagram illustrating a number of erased blocks according to sets of throttling numbers of a semiconductor memory system in accordance with an embodiment of the present invention.

FIG. 7B is a diagram illustrating a number of erased blocks according to sets of throttling numbers of a semiconductor memory system in accordance with an embodiment of the present invention.

When the number of erased blocks is over the Max GC throttle block number, performance of BGC is "0" because the BGC can be stopped.

When the number of erased blocks falls below the Max GC throttle block number, the BGC can start throttling at the BGC throttling mode. Two options can be available for the BGC throttling:

1. The HOST traffic is light, and the memory system can maintain the number of erased blocks even with the throttled BGC, 2. The HOST traffic is heavy, and the memory system may not maintain the number of erased blocks higher than the Min GC throttle block number, resulting in the switching from the BGC throttling mode to the HOST throttling mode when the number of erased blocks reaches the Min GC throttle block. When the HOST traffic is changed from heavy to light, the BGC can be capable to restore the number of erased blocks. If the number of erased blocks exceeds Max host throttle block number, the throttling can be switched to the BGC throttling mode when the number of erased blocks reaches the Max host throttle block number.

When the number of erased blocks is less than the Max HOST throttle block number, the HOST can start throttling. Two options can be available for the HOST throttling:

1. The HOST traffic is heavy, and the memory system can maintain the number of erased blocks only with the throttled HOST, 2. The HOST traffic is light, and the memory system may not maintain the number of erased blocks lower than the Max HOST throttle block number, resulting in the switching from the HOST throttling mode to BGC throttling mode when the number of erased blocks reaches the Max host throttle block number. When the HOST traffic is changed from light to heavy, the HOST can be capable to constrain the number of erased blocks. If the number of erased blocks drops under the Min BGC throttle block number, the throttling can be switched to the HOST throttling mode when the number of erased blocks reaches the Min BGC throttle block number.

Throttling controller of FIG. 6 can throttle the BGC command flow 616 and HOST command flow 618 by a BGC/HOST ratio. The ratio between the HOST and BGC can be represented by a write amplification factor $A_f$, or an effective write amplification eWA, wherein $eWA = 1/A_f$, wherein the $A_f$ may be more convenient for calculations. The $A_f$ and eWA can be calculated as:

$$A_f = eWA^{-1} = \frac{\text{number of valid pages in } BGC \text{ block}}{\text{number of invalid pages in } BGC \text{ block}} = \frac{\text{number of } BGC \text{ commands}}{\text{number of HOST commands}} \quad (1)$$

Wherein, the number of BGC commands can be equal to the number of valid pages in BGC block, because each of the valid pages may need to be moved during BGC. The number of HOST commands can be equal to the number of invalid pages in BGC block, because pages can be invalidated when the HOST overwrites locations which have been written previously. For example, for fully filled memory system, every HOST command can overwrite locations previously written.

The number of the HOST commands and the BGC commands can be calculated in accordance with the $A_f$ or eWA during throttling. The number of HOST commands and the number of BGC commands calculated in accordance with the $A_f$ or eWA can be used as guidance to balance the HOST command flow and the BGC command flow. Therefore, the memory system with the throttling can maintain a consistent and optimal performance, following the balanced HOST commands flow and BGC commands flow. To simplify the HOST/BGC commands ratio calculation and reduce calculation overhead, the following assumptions can be made:

1. Time of read commands for NAND flash memory can be negligible and may not affect performance consistency as much as the write commands do. Thus, only the write commands may be counted and throttled.

2. The Host commands and the system commands can have higher priority than the BGC commands. The higher priority of the HOST commands and system commands can be necessary to reduce HOST commands latencies.

3. The BGC may always have buffers to write.

Calculation with the write amplification factor $A_f$ or effective write amplification eWA can be introduced in the embodiments of present invention, extra write commands may be requested when relocation of valid pages are needed.

The number of commands per time slot can be calculated by above formula (1) as following. Wherein a time slot is a period of time used to count the numbers of commands and calculate the throttling parameters within the time slot. A longer time slot can provide more information and result in more accurate calculation, while a shorter time slot with less information can result in faster response to workload changes. The time slot can be predetermined and may be changed in accordance with the memory system and the application thereof.

For the Host throttling mode, $$\text{Number of HOST commands} = \frac{\text{number of } BGC \text{ commands}}{A_f} \quad (2)$$
$$= (\text{number of } BGC \text{ commands}) \times eWA$$

For the BGC throttling mode, $$\text{number of } BGC \text{ commands} = \text{number of HOST commands} \times A_f \quad (3)$$
$$= \frac{\text{number of HOST commands}}{eWA}$$

Calculation of BGC/HOST commands ratio by formulas (2) and (3) may not consider:

1. other commands that can be sent to NAND flash by some background activity;
2. write errors, read retries; and
3. bad blocks and so on.

In real scenarios, the calculation of BGC/HOST commands ratio by formulas (2) and (3) may often have errors.

Ideally, the number of erased blocks can be equal to the balance points. If the number of erased blocks is lower than the balance point, productivity of BGC may be not enough to compensate performance of the HOST, such that the HOST may send too many HOST commands. And vice versa, if the number of erased blocks is higher than the balance point, the BGC is too aggressive for current HOST traffic.

In order to compensate all kind of errors, throttling calculation can introduce feedback based on number of current erased blocks.

Figure 8:
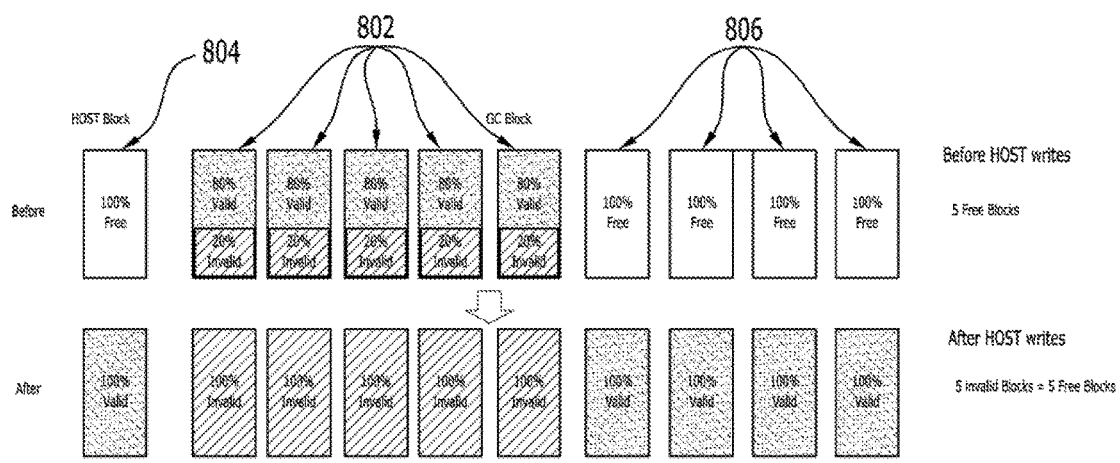
FIG. 8 is a diagram illustrating memory blocks during throttling of a semiconductor memory system in accordance with an embodiment of the present invention.

FIG. 8 is a diagram illustrating memory blocks during throttling of a semiconductor memory system in accordance with an embodiment of the present invention. FIG. 8 shows an example of erased blocks or open blocks in the memory system, before and after the HOST fills the open blocks. The eWA is used for calculation in the example shown in FIG. 8.

Assuming each block shown in FIG. 8 comprises 100 pages. Before the HOST files the open blocks, target blocks 802 for the BGC are mixed blocks with 80% valid pages and 20% invalid pages. Thus, the eWA can be calculated as 20/80=0.25. An eWA of 0.25 indicates that if the HOST writes 100 pages, the BGC needs to write 100/0.25=400 pages to balance the number of free blocks in the memory system, such that the HOST can have sufficient open blocks for write operation.

The HOST has a HOST block 804 available for the write operation, wherein the HOST block 804 is a free block with 100% valid pages. Before the HOST fills the HOST block 804, the memory system had 5 free blocks including the HOST block 804 and BGC blocks 806. During the throttling, when the HOST sends 101 HOST commands to fill the HOST block 804, the BGC can send 400 BGC commands in accordance with the eWA, to relocate 80 valid pages of the target blocks 802 into the BGC blocks 806. The valid pages of the 5 target blocks 802 can be consolidated into the 4 BGC blocks 806. The target blocks 802 can be freed up as 5 invalid blocks or 5 free blocks.

The target blocks 802 mixed with valid pages and invalid pages can be recycled into 100% invalid pages, and the valid pages of the target blocks 802 can be consolidated into 4 BGC blocks 806. Thus, after the HOST writes, the open blocks shown in FIG. 8 can be consolidated as occupied/valid blocks with 100% valid pages and free/invalid blocks with 100% invalid pages. Since all of the blocks have either 100% valid pages or 100% invalid pages, no blocks are mixed blocks with both the valid pages and invalid pages, and no blocks are needed to relocate the valid pages thereof to other free/invalid blocks. The HOST commands, such as the write command, can be executed directly in a shorter operation time, resulting in an improved performance of the memory system.

Figure 9:
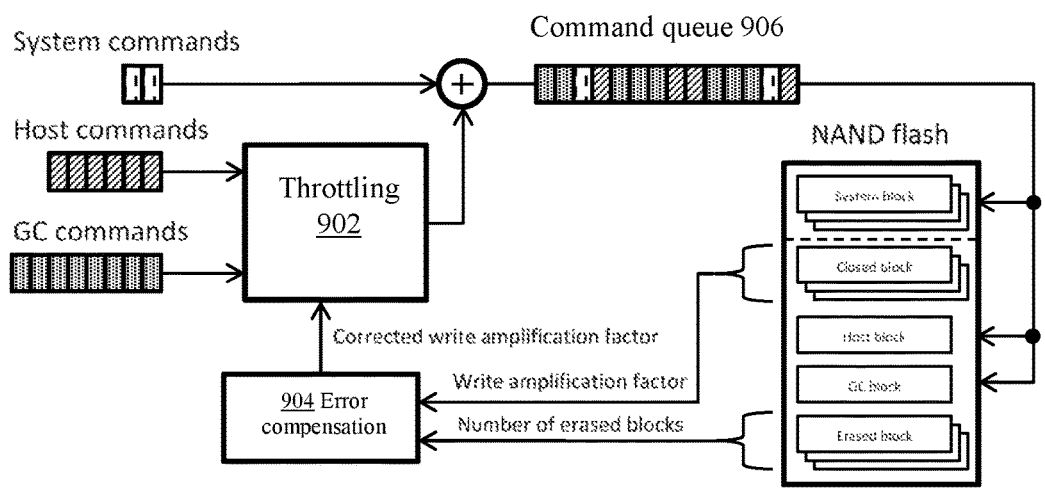
FIG. 9 is a block diagram schematically illustrating throttling with feedback of a semiconductor system in accordance with an embodiment of the present invention.

FIG. 9 is a block diagram schematically illustrating throttling with feedback of a semiconductor system in accordance with an embodiment of the present invention.

$A_f$ or eWA calculation can include the feedbacks to correct the discrepancies caused by the errors in the real case scenarios, wherein the feedback can be based on the number of current erased blocks.

The errors of a throttling 902 including the HOST throttling 606 and BGC throttling 608 of FIG. 6, can be compensated with an error compensation 904. The error compensation 904 can have inputs of the write amplification factor $A_f$ or effective write amplification eWA, the number of erased blocks, and outputs of a corrected write amplification factor $A_{kf}$ or corrected effective write amplification eWAcorr. The throttling 902 can throttle the HOST commands and BGC commands, the throttled results can be combined with system commands, then sent to a command queue 906 for execution. The commands queued in the command queue 906 can be forwarded to corresponding blocks when ready for execution. For example, the system commands can be forwarded to system blocks, the HOST commands can be forwarded to HOST blocks, and the BGC commands can be forwarded to GC blocks.

The $A_f$ or eWA representing BGC/HOST commands ratio can be corrected by applying the error correction factor k to $A_f$ or eWA:

$$A_{kf}=A_f \times k;\ eWAcorr=eWA \times k; \quad (4)$$

Correction factor k can be any type of functions including linear, quadratic, or cubic. The type of correction function and range of correction can be selected based on memory system characteristics and requirements thereof.

General formula for correction coefficient, such as the error correction factor k, is:

$$k = \begin{cases} \text{if } B_{current} \geq B_{balance},\ 1 - k_{max\ neg} \times \left(\frac{B_{current} - B_{balance}}{B_{max} - B_{balance}}\right)^{POW}; \\ \text{if } B_{current} < B_{balance},\ 1 + k_{max\ pos} \times \left(\frac{B_{balance} - B_{current}}{B_{balance} - B_{min}}\right)^{POW}. \end{cases} \quad (5)$$

Wherein, $B_{current}$—Current block number $B_{balance}$—Balance point for current mode $k_{max\ pos}$—Maximal positive correction factor for current mode $k_{max\ neg}$—Minimal positive correction factor for current mode $B_{max}$—Maximal allowed number of erased blocks for current mode $B_{min}$—Minimal allowed number of erased blocks for current mode POW—power of the correction function (1, 2, 3, etc.)

The error correction factor k can be used to change the ratio between HOST and BGC, represented by eWA or $A_f$. The corrected results of eWAcorr or $A_{kf}$, and incorporation of the system commands can improve the accuracy for calculation of the throttle parameters.

Figure 10:
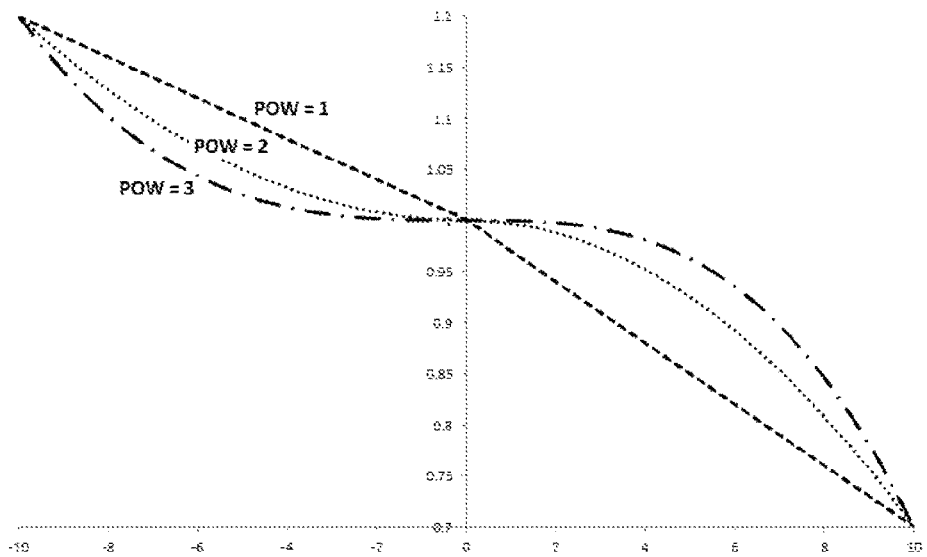
FIG. 10 is a diagram illustrating correction factors in throttling in a memory system of embodiments of present invention.

FIG. 10 is a diagram illustrating error correction factors in throttling in a memory system of embodiments of present invention. FIG. 10 shows graphical representation of corrections with various POW values, for the number of erased blocks ranging ±10 from the balance point, as shown on horizontal coordinate, and rang of the error correction factor k, as shown on vertical coordinate, is $[k_{max\ neg}; k_{max\ pos}]=[-30\%; +20\%]$.

Negative correction can be applied if the HOST starts to massively invalidate pages in opened BGC blocks. In this case, actual $A_f$ of opened BGC block become much lower than calculated $A_f$. Hence, the number of erased blocks of the memory system can go up because the BGC is too aggressive and produces too many erased blocks. Increased number of erased blocks can lead to decreased $A_{kf}$, resulting in $A_{kf}$ can approach the actual $A_f$ closely in this situation without additional calculations.

Positive correction can be applied if the BGC/HOST blocks are forcibly closed before are filled. The closure can be caused by NAND error or read disturbance, and can lead to situation that actual $A_f$ or eWA can be different than the calculated values thereof. Reduction of the number of erased blocks in the memory system can reveal the situation, and $A_{kf}$ or eWAcorr can be corrected accordingly.

Summarizing the aforesaid, formulas (2) and (3) for $A_{kf}$ can take the forms:

$$\text{number of HOST commands}_n = \frac{AVG(\text{number of } BGC \text{ commands})_{n-1}}{A_{kf}} \quad (6)$$

$$\text{number of BGC commands}_n = \frac{}{AVG(\text{number of host commands})_{n-1} \times A_{kf}} \quad (7)$$

Wherein, n—number of time slot $A_{kf}$—corrected write amplification factor $$AVG(Y)_{n-1} = AVG(Y)_{n-2} + \frac{Y_{n-1} - AVG(Y)_{n-2}}{\text{Averaging window size}},$$

—cumulative moving average of Y, wherein the average is descripted in details below.

The throttling mechanism descripted above can be utilized in the memory system satisfying customers' requirements for write and mixed workload performance consistency and IO commands delays.

Figure 11:
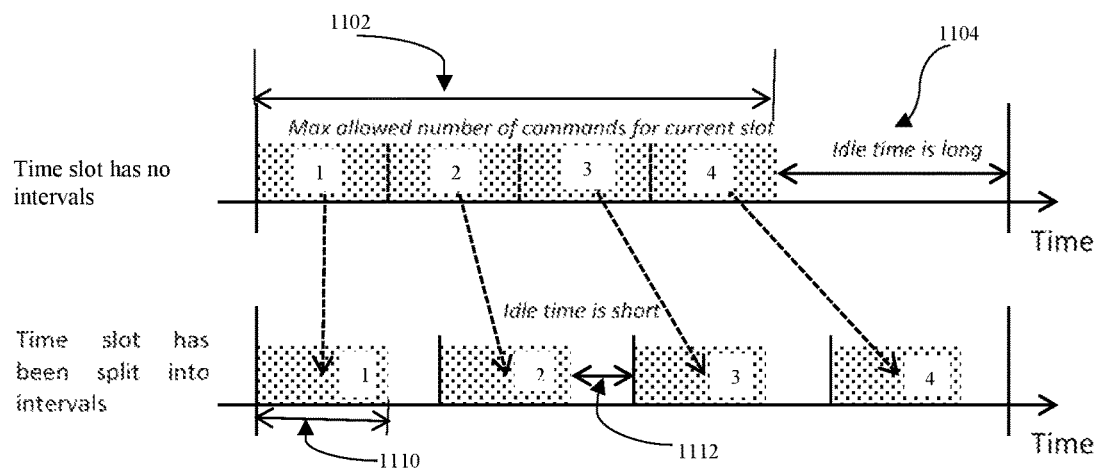
FIG. 11 is a diagram illustrating time slots in throttling of a semiconductor memory system in an embodiment of the present invention.

FIG. 11 is a diagram illustrating time slots in throttling of a semiconductor memory system in an embodiment of the present invention.

Time slot is period of time that can be used by throttling for improving throttling efficiency. The time slot can be used to measure the bandwidth of the memory system for determining number of commands for next time slot, by counting number of commands sent during current time slot.

The time slot can be used to limit the number of HOST commands for HOST throttling mode, and the number of BGC commands for the BGC throttling mode.

The bandwidth of memory system can be constant value in a short period of time, although can be changed in a long period of time because of NAND aging of the memory system. Hence, total number of all commands, such as the HOST commands, the BGC commands, and system commands, sent during each time slot can be approximately equal. The number of commands counted during the current time slot, such as the HOST commands and BGC commands, can be used for calculation of maximum allowed number of commands for the next time slot, either the HOST commands or BGC commands depending on the throttling mode.

As shown in FIG. 11, when the time slots are not divided into intervals, the max allowed number of commands for current time slot can be sent at beginning of the current time slot, such as command time period 1102, while no commands can be sent during the rest of the time slots, such as idle time period 1104. The max allowed number of commands for the current time slot, including command groups 1, 2, 3, and 4, can be calculated in accordance with commands of a previous time slot.

Although the time slots can be used to calculate throttling parameters, the time slots are too long to be used for throttling. Especially for a small number of commands. During throttling, all allowed commands can be sent at beginning of each time slot, when the bandwidth of memory system is available for sending the allowed commands. After all allowed commands sent, any upcoming commands can be blocked during idle time until a new subsequent time slot starts. Sending all of allowed commands at beginning of each time slot can create a delay affecting performance characteristics of the memory system, such as Quality of Service.

To avoid the delay discussed above, intervals can be used for even distribution of commands in the time. The intervals can be used to evenly distribute commands within each time slot, wherein the intervals usually are shorter than the time slot. Each time slot can be evenly divided into a plurality of intervals. Instead of receiving all commands at beginning of each time slot, the commands can be distributed evenly at each interval, such as one command per interval.

As shown in FIG. 11, the commands can be distributed and executed at beginning of each interval, such as command time interval period 1110, the throttling can be conducted during idle time interval period 1112 after the command execution. The command groups 1, 2, 3, and 4 can be evenly distributed and executed in each interval. The mechanism of executing commands at beginning of each interval can provide prompt throttling after each command execution, to balance the BGC commands and HOST commands. Throttling following each command execution can provide more accurate information for calculating the throttling parameters for the next iteration in the next time slot.

Figure 12:
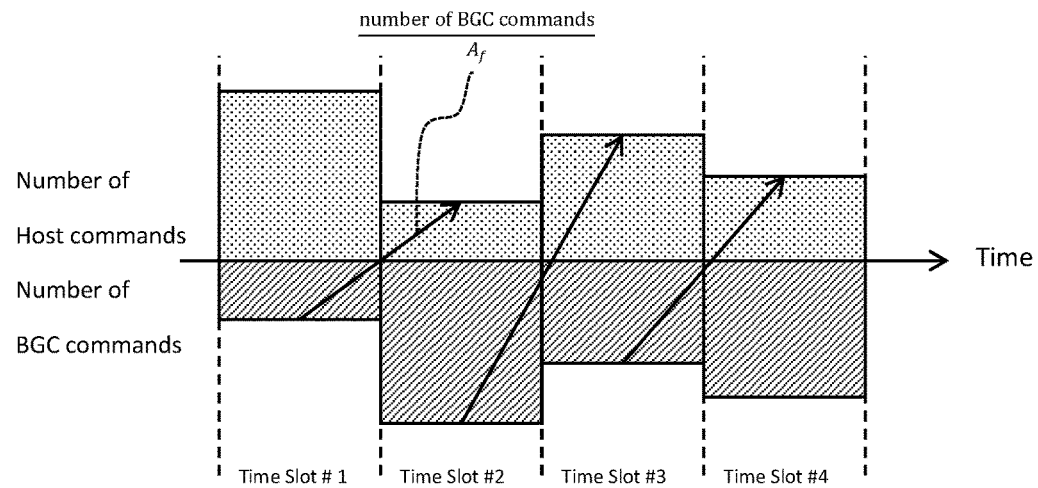
FIG. 12 is a diagram illustrating fluctuations of performance of a semiconductor memory system in an embodiment of the present invention.

FIG. 12 is a diagram illustrating fluctuations of performance of a semiconductor memory system in an embodiment of the present invention.

In the memory system, NAND bandwidth can be shared between the HOST commands and BGC commands. The total number of commands can be sent during a certain time period is limited by the bandwidth. When the HOST consumes more bandwidth, the BGC can be restricted to less bandwidth. For example, if the HOST sends many commands, the BGC can be forced to send fewer commands. Excess of the HOST commands or BGC commands under the limited bandwidth can create a "swing" scenario as shown in FIG. 12, caused by imbalanced ratio between the HOST commands and BGC commands. Thus, using instant values for calculation can cause fluctuations of performance of the memory system.

For example, consider the situation for HOST throttling mode as shown in FIG. 12. If throttling just get starts, such that after power up, the throttling can have no history. In a first time slot #1, throttling can allow the HOST and BGC to send maximal possible number of commands, such that no HOST throttling at all. Since HOST commands have higher priority, the number of HOST commands can be higher than the number of BGC commands. According to formula (2), the max allowed number of HOST commands for time slot #2 can be low and BGC can use the rest of the bandwidth to send high number of BGC commands. The high number of BGC commands can lead to high number of allowed HOST commands in time slot #3, and so on.

Figure 13:
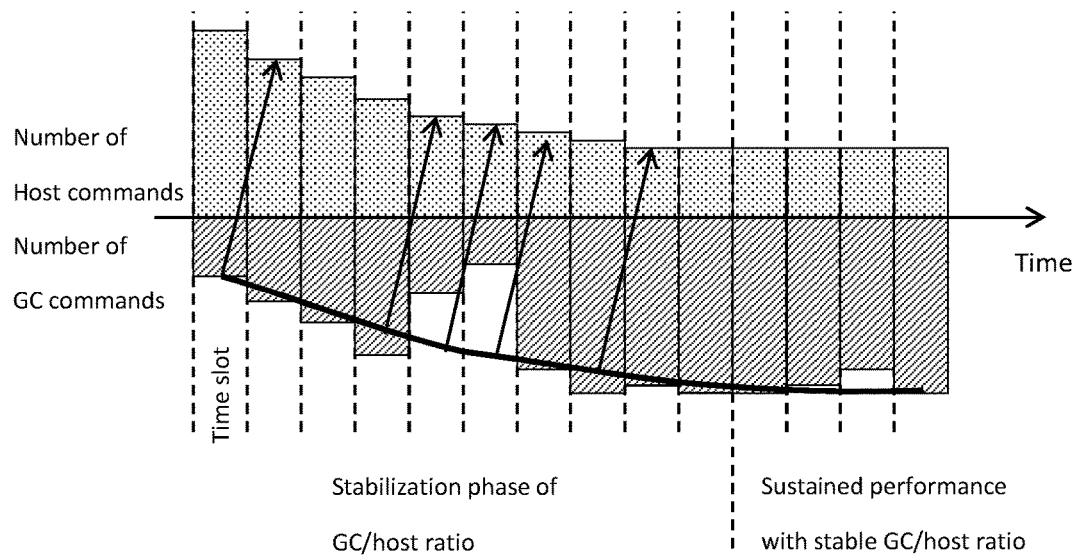
FIG. 13 is a diagram illustrating utilization of averaging during throttling of a semiconductor memory system in an embodiment of the present invention.

FIG. 13 is a diagram illustrating utilization of averaging during throttling of a semiconductor memory system in an embodiment of the present invention.

To suppress the "swing" scenario or fluctuations of performance, averaging can be used in throttling for throttling parameters calculation. Instead of using instantaneous value of the BGC commands and HOST commands, throttling parameters calculation can use moving average values of the BGC commands and HOST commands. Utilization of the moving average values can improve performance consistency and avoid latencies of the memory system, even if the BGC commands are blocked for a short period of time, and the BGC may not be able to use entire bandwidth because of other background activities.

For example, at HOST throttling mode as shown in FIG. 13, the number of BGC commands is much higher than the number of HOST commands at time slot #1. At time slot #2, the number of HOST commands can be adjusted in accordance with the average value of BGC commands in the time slot #1, and can be different than the real number of BGC commands in time slot #1. Following the same principal, the number of HOST commands (n) at time slot #n can be calculated in accordance with the average value of BGC commands at time slot #(n−1). Over the time, the number of HOST commands can be stabilized at a consistent level. The average value of the BGC commands can approach the instantaneous value of the BGC commands over the time, reflecting the actual value promptly and resulting in elimination of the "swing" scenario.

Drawback of using the moving average values in calculation can be stabilization phase, such that a long stabilization time may be needed to reach sustained performance.

Figure 14:
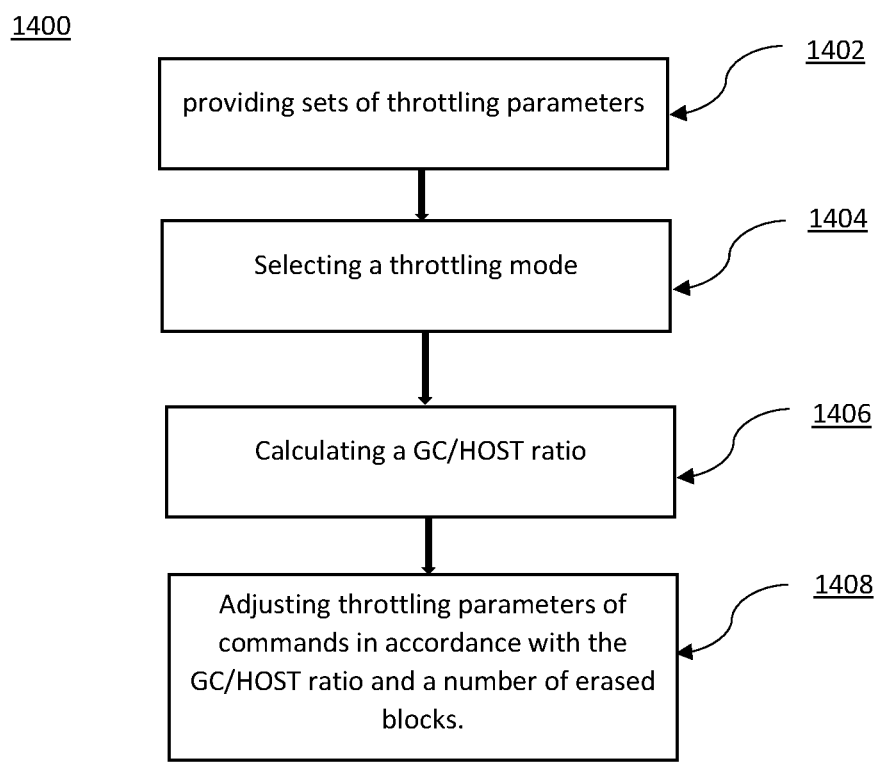
FIG. 14 is a flowchart illustrating an operating method of a semiconductor memory system in a further embodiment of the present invention.

FIG. 14 is a flowchart illustrating an operating method of a semiconductor memory system in a further embodiment of the present invention. The flowchart 1400 includes providing sets of throttling parameters in a block of 1402, selecting a throttling mode in a block of 1404, calculating a garbage collection (GC)/HOST ratio based on at least a part of invalid count of GC blocks and valid count of GC blocks in a block of 1406, and adjusting throttling parameters of commands in accordance with the GC/HOST ratio and a number of erased blocks in a block of 1408.

Throttling in a memory system can optimize execution of the HOST commands and the BGC commands. An appropriate number of free blocks can be maintained at a desired level, result in reduction of power consumption and improvement of performance consistency.

The throttling in the embodiments of the present invention can provide good performance consistency in wide range of HOST traffic intensity, by throttling either the BGC commands or HOST write commands. Throttling of only one source of commands can fully utilize 100% of available bandwidth of memory system. Throttling mode can be selected depending on the current number of erased NAND flash blocks, HOST traffic, write amplification factor or eWA, or a combination thereof.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A semiconductor memory system comprising:
a memory device; and
a memory controller including a processor, coupled to the memory device, containing instructions executed by the processor, and configured to
select a throttling mode based on a number of erased blocks of the memory device,
calculate a background garbage collection (BGC) command/HOST command ratio (BGC/HOST ratio) based at least in part on an invalid page count of at least one BGC block and a valid page count of the at least one BGC block, and
adjust throttling parameters of commands including a set of host throttling numbers for throttling HOST commands and a set of BGC throttling numbers for throttling BGC commands in accordance with the BGC/HOST ratio, the selected throttling mode, and a number of erased blocks.

2. The system of claim 1 wherein each of the sets of throttling numbers includes a maximum throttling number, a minimum throttling number, and a throttling balance point.

3. The system of claim 1 wherein the throttling mode includes a BGC throttling mode and a HOST throttling mode, wherein the BGC throttling mode is set when performance of HOST is less than productivity of BGC, and the HOST mode is set when the performance of HOST is greater than or equal to the productivity of BGC.

4. The system of claim 1 wherein the throttling parameters of commands include throttling parameters of commands of a current time slot calculated based on measurements of a previous time slot.

5. The system of claim 1 wherein the BGC/HOST ratio is calculated based at least in part on an error correction factor.

6. The system of claim 1 wherein the BGC/HOST ratio is calculated based at least in part on the throttling parameters and the number of erased blocks in accordance with the selected throttling mode.

7. The system of claim 1 wherein the BGC/HOST ratio includes a write amplification factor.

8. The system of claim 1 wherein the BGC/HOST ratio is calculated within a time slot including a plurality of intervals, HOST commands are distributed in each of the plurality of intervals.

9. The system of claim 1 wherein a number of HOST commands is calculated in accordance with the BGC/HOST ratio and a number of BGC commands of a prior time slot at a HOST throttling mode, and a number of BGC commands is calculated in accordance with the BGC/HOST ratio and a number of HOST commands of the prior time slot at a BGC throttling mode.

10. The system of claim 9 wherein the number of HOST commands of the prior time slot includes an average value of HOST commands, and the number of BGC commands of the prior time slot includes an average value of BGC commands.

11. An operating method of a semiconductor memory system comprising:
selecting a throttling mode based on a number of erased blocks of the memory system,
calculating a background garbage collection (BGC) command/HOST command ratio (BGC/HOST ratio) based at least in part on an invalid count of at least one BGC block and a valid count of the at least one BGC block, and
adjusting throttling parameters of commands including a set of host throttling numbers for throttling HOST commands and a set of BGC throttling numbers for throttling BGC commands in accordance with the BGC/HOST ratio, the selected throttling mode, and a number of erased blocks.

12. The method of claim 11 wherein each of the sets of throttling numbers includes a maximum throttling number, a minimum throttling number, and a throttling balance point.

13. The method of claim 11 wherein the selecting the throttling mode includes selecting a BGC throttling mode and a HOST throttling mode, wherein the BGC throttling mode is set when performance of HOST is less than productivity of BGC, and the HOST mode is set when the performance of HOST is greater than or equal to the productivity of BGC.

14. The method of claim 11 wherein the adjusting the throttling parameters of commands includes adjusting throttling parameters of commands of a current time slot calculated based on measurements of a previous time slot.

15. The method of claim 11 wherein the calculating BGC/HOST ratio includes calculating the BGC/HOST ratio based at least in part on an error correction factor.

16. The method of claim 11 wherein the calculating of the BGC/HOST ratio includes calculating the BGC/HOST ratio based at least in part on the throttling parameters and the number of erased blocks in accordance with the selected throttling mode.

17. The method of claim 11 wherein the calculating BGC/HOST ratio includes calculating a write amplification factor.

18. The method of claim 11 wherein the calculating BGC/HOST ratio includes calculating the BGC/HOST ratio within a time slot including with a plurality of intervals, HOST commands are distributed in each of the plurality of intervals.

19. The method of claim 11 wherein a number of HOST commands is calculated in accordance with the BGC/HOST ratio and a number of BGC commands of a prior time slot commands at a HOST throttling mode, and a number of BGC commands is calculated in accordance with the BGC/HOST ratio and a number of HOST commands at a BGC throttling mode.

20. The method of claim 19 wherein the number of HOST commands of the prior time slot includes an average value of HOST commands, and the number of BGC commands of the prior time slot includes an average value of BGC commands.

* * * * *